US012649134B2

(12) United States Patent
Raupp et al.

(10) Patent No.: US 12,649,134 B2
(45) Date of Patent: Jun. 9, 2026

(54) APPARATUS FOR PRODUCING A PULVERULENT PRODUCT AND USE THEREOF

(71) Applicant: BASF SE, Ludwigshafen (DE)

(72) Inventors: Sebastian Marius Raupp, Ludwigshafen (DE); Sylvia Bertha, Ludwigshafen (DE); Andreas Daiss, Ludwigshafen (DE); Marco Krueger, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 688 days.

(21) Appl. No.: 17/920,785

(22) PCT Filed: Apr. 22, 2021

(86) PCT No.: PCT/EP2021/060538
§ 371 (c)(1),
(2) Date: Oct. 22, 2022

(87) PCT Pub. No.: WO2021/214224
PCT Pub. Date: Oct. 28, 2021

(65) Prior Publication Data
US 2023/0149871 A1    May 18, 2023

(30) Foreign Application Priority Data

Apr. 24, 2020    (EP) .................................... 20171288

(51) Int. Cl.
*B01J 2/04*        (2006.01)
*C08F 6/10*        (2006.01)
(52) U.S. Cl.
CPC .. *B01J 2/04* (2013.01); *C08F 6/10* (2013.01)
(58) Field of Classification Search
CPC ....... B01J 2/04; B01J 2/16; B01J 19/24; B01J 19/26; B01J 19/245; B01J 19/06;
(Continued)

(56) References Cited

U.S. PATENT DOCUMENTS 6,987,152 B1 *   1/2006   Eisinger ................ C08F 210/16
                                              585/824
8,084,557 B2 *  12/2011   Hecker .................. C10G 50/00
                                              585/818

(Continued)

FOREIGN PATENT DOCUMENTS

CN         206372782 U      8/2017
GB          1233479 A       5/1971
(Continued)

OTHER PUBLICATIONS

International Application No. PCT/EP2021/060538, International Search Report and Written Opinion, mailed Aug. 17, 2021.

*Primary Examiner* — Dapinder Singh
(74) *Attorney, Agent, or Firm* — Element IP, PLC

(57) ABSTRACT

The invention relates to an apparatus for producing a pulverulent product, comprising a device for dropletization (5) of a liquid phase, an addition point (15) for a gas above the device for dropletization (5), at least one gas withdrawal point (19) on the circumference of the apparatus (1), a solid withdrawal point (12) and a tower shell (13) between the device for dropletization (5) and the gas withdrawal point (19) and having, above the solid withdrawal point (12), a region (11) having at least partly a decreasing hydraulic diameter toward the solid withdrawal point (12) and having a maximum hydraulic diameter greater than the mean hydraulic diameter of the tower shell (13), and the tower shell (13) projecting into the region (11) having at least partly a decreasing hydraulic diameter such that an annular duct (23) is formed between the part of the tower shell (13) projecting into the region (11) having at least partly a decreasing hydraulic diameter and the upper part (27) of the region having at least partly a decreasing hydraulic diameter, the at least one gas withdrawal point (19) being disposed in the annular duct (23), wherein the part of the tower shell (13)
(Continued)

projecting into the region (11) having at least partly a decreasing hydraulic diameter and forming an inner wall of the annular duct (23) is made at least partly of a gas permeable material (29). The invention further relates to a use of the apparatus (1) for producing pulverulent poly (meth)acrylate.

14 Claims, 5 Drawing Sheets

(58) Field of Classification Search
CPC . B01J 19/2405; B01J 4/00; B01J 4/001; B01J 4/04; B01J 4/002; B01J 8/0055; B01J 8/1818; B01J 8/22; B01J 8/24; B01J 2208/00761; B01J 2219/185; B01J 2219/00414; B01J 2219/0072; B01J 2219/00247; C08F 6/10; C08F 2/34; C08F 2/01; C08F 2/12; C08F 20/14; C08F 20/18; C08F 120/14
See application file for complete search history.

(56) References Cited

U.S. PATENT DOCUMENTS

| | | | | |
|---|---|---|---|---|
| 9,382,344 | B2 * | 7/2016 | Ho | C08F 2/01 |
| 11,117,983 | B2 * | 9/2021 | Sattler | C08F 6/003 |
| 2008/0194777 | A1 * | 8/2008 | Richard | C08F 6/02 |
| | | | | 422/131 |
| 2017/0145129 | A1 * | 5/2017 | Reed | C08F 6/02 |
| 2018/0319906 | A1 | 11/2018 | Kruger et al. | |
| 2018/0326392 | A1 | 11/2018 | Krueger et al. | |

FOREIGN PATENT DOCUMENTS

| | | | |
|---|---|---|---|
| JP | S5556801 | A | 4/1980 |
| JP | S62152502 | A | 7/1987 |
| JP | S63190629 | A | 8/1988 |

* cited by examiner

APPARATUS FOR PRODUCING A PULVERULENT PRODUCT AND USE THEREOF

CROSS-REFERENCE TO RELATED APPLICATIONS

This is the U.S. national phase of International Application No. PCT/EP2021/060538, filed Apr. 22, 2021, which claims the benefit of European Patent Application No. 20171288.2, filed on Apr. 24, 2020.

The invention relates to an apparatus for producing a pulverulent product, comprising a device for dropletization of a liquid phase, an addition point for a gas above the device for dropletization, at least one gas withdrawal point on the circumference of the apparatus, a solid withdrawal point and a tower shell between the device for dropletization and the gas withdrawal point and having, above the solid withdrawal point, a region having at least partly a decreasing hydraulic diameter toward the solid withdrawal point and having a maximum hydraulic diameter greater than the mean hydraulic diameter of the tower shell, and the tower shell projecting into the region having at least partly a decreasing hydraulic diameter such that an annular duct is formed between the part of the tower shell projecting into the region having at least partly a decreasing hydraulic diameter and the upper part of the region having at least partly a decreasing hydraulic diameter, the at least one gas withdrawal point being disposed in the annular duct. The invention further relates to the use of such an apparatus.

One application of such an apparatus for example is the production of poly(meth)acrylates which particularly find use as water-absorbing polymers which are used for example, in the production of diapers, tampons, sanitary napkins and other hygiene articles, or else as water-retaining agents in market gardening.

Different processes are known for the production of water-absorbing polymers. For example, the monomers and any additives used for production of poly(meth)acrylates can be added to a mixing kneader, in which the monomers react to give the polymer. Rotating shafts with kneading bars in the mixing kneader break up the polymer formed into chunks. The polymer withdrawn from the kneader is dried and ground and sent to further processing. In an alternative variant, the monomer is introduced in the form of a monomer solution which may also comprise further additives into a reactor for droplet polymerization. On introduction of the monomer solution into the reactor, it disintegrates into droplets. The mechanism of droplet formation may be turbulent or laminar jet disintegration, or else dropletization. The mechanism of droplet formation depends on the entry conditions and the physical properties of the monomer solution. The droplets fall downward in the reactor, in the course of which the monomer reacts to give the polymer. In the lower region of the reactor is a fluidized bed into which the polymer particles formed from the droplets by the reaction fall. Further reaction then takes place in the fluidized bed. Corresponding processes are described, for example, in WO-A 2006/079631, WO-A 2008/086976, WO-A 2007/031441, WO-A 2008/040715, WO-A 2010/003855, WO-A 2011/026876 and WO-A 2017/085093.

In the reactors for droplet polymerization described, gas is added at two points. A first gas stream is introduced above the device for dropletization and a second gas stream from below through the fluidized bed. These gas streams have opposing flow directions. The gas is drawn off from the reactor via the annular duct which is formed by the tower shell which projects into the region with decreasing hydraulic diameter. In this case, the entire gas volume supplied to the reactor has to be conducted away. This leads to high gas velocities in the region of the annular duct, and the gas velocities can be so high that polymer material is entrained with the gas through the annular duct. This leads firstly to a reduction in the yield or to elevated load on the off-gas dedusting; secondly, there is a risk that the entrained particles can stick to walls of the annular duct and the downstream gas-conducting lines as a result of as yet incompletely reacted monomer solution and thus lead to unwanted deposits.

To avoid droplet or particle entrainment, WO-A 2017/085093 suggests designing the annular duct such that the ratio of the horizontal area of the annular duct to the horizontal area enclosed by the tower shell is in the range from 0.3 to 5.

It is a disadvantage of the reactor for droplet polymerization that by the tower shell projecting into the region having at least partly a decreasing hydraulic diameter the gas flow is constricted and further the gas flowing downwards in the reactor must be deflected for 180° by the gas stream flowing upwards through the fluidized bed. This may result in turbulence and possible entrainment of small particles or in eddies in which particles are trapped. Further, the tower shell being elongated such that it projects into the region having at least partly a decreasing hydraulic diameter results in additional weight which impedes handling of the tower shell and according to the description of WO-A 2017/085093 additional struts in the annular duct for static stabilization may be necessary. However, such struts in the annular duct are disadvantageous because they form constrictions which may lead to higher velocities at the annular duct inlet and thus to higher particle entrainment into the duct.

Therefore, it is an object of the present invention to provide an apparatus for producing a pulverulent product which does not have the disadvantages of the apparatus as known from the art.

This object is achieved by an apparatus for producing a pulverulent product, comprising a device for dropletization of a liquid phase, an addition point for a gas above the device for dropletization, at least one gas withdrawal point on the circumference of the apparatus, a solid withdrawal point and a tower shell between the device for dropletization and the gas withdrawal point and having, above the solid withdrawal point, a region having at least partly a decreasing hydraulic diameter toward the solid withdrawal point and having a maximum hydraulic diameter greater than the mean hydraulic diameter of the tower shell, and the tower shell projecting into the region having at least partly a decreasing hydraulic diameter such that an annular duct is formed between the part of the tower shell projecting into the region having at least partly a decreasing hydraulic diameter and the upper part of the region having at least partly a decreasing hydraulic diameter, the at least one gas withdrawal point being disposed in the annular duct, wherein the part of the tower shell projecting into the region having at least partly a decreasing hydraulic diameter and forming an inner wall of the annular duct is made at least partly of a gas permeable material.

By the part of the tower shell projecting into the region having at least partly a decreasing hydraulic diameter and forming the inner wall of the annular duct being made at least partly of the gas permeable material particularly a part of the gas flowing downwards in the tower shell can flow directly into the annular duct through that parts which are made of the gas permeable material and does not need to flow around the tower shell projecting into the region having at least partly decreasing hydraulic diameter. The parts which are made of the gas permeable material have the additional effect that the area through which the gas can flow is larger and, thus, the velocity of the gas entering the annular duct can be reduced which results in less trapping of particles and less particle entrainment into the annular duct. The reduced gas velocity has the additional advantage that also the formation of eddies is reduced which results in a further reduction of particle entrainment into the annular duct.

Additionally, by the parts of the tower shell being made of the gas permeable material, material can be saved and thus the weight of the tower shell is reduced and it may be possible to omit support struts running in the annular duct.

The hydraulic diameter $d_h$ is defined as:

$$d_h = 4 \cdot A/C$$

where A is area and C is circumference. Using the hydraulic diameter renders the configuration of the apparatus independent of the shape of the cross-sectional area. This area may, for example, be circular, rectangular, in the shape of any polygon, oval or elliptical. However, preference is given to a circular cross-sectional area. In the context of the present invention, the mean hydraulic diameter is understood to mean the arithmetic mean.

The pulverulent product produced in the apparatus preferably has a Sauter mean particle diameter in a range from 1 μm to 10 mm, more preferred in a range from 10 μm to 1 mm and particularly in a range from 50 μm to 500 μm.

The gas permeable material preferably is selected such that droplets or particles being distributed in the gas stream cannot pass the gas permeable material. Therefore, the gas permeable material preferably has a mesh size which depends on the mean value and the width of particle size distribution. The bigger the particles produced in the apparatus and the narrower the particle size distribution, the bigger the mesh size can be. Preferably, the gas permeable material has a mesh size in the range from 0.5 μm to 5 mm. More preferred, the gas permeable material has a mesh size in the range from 2 μm to 1 mm, and particularly in the range from 10 μm to 500 μm. Thereby, the mesh size of the gas permeable material is selected such that with respect to the particle size distribution of the pulverulent product produced in the apparatus at least 50 wt-% of the pulverulent product, more preferred at least 75 wt-% of the pulverulent product and particularly at least 90 wt-% of the pulverulent product are retained by the gas permeable material.

Suitable as gas permeable material for example is a metal braid, a woven fabric, a netting, a grid material, a mesh material, a perforated plate or a non-woven or felt. The gas permeable material is preferably made of temperature and chemical resistant metals, ceramics, natural fibers, synthetic fibers or mineral fibers or combinations of these materials. Examples of these materials are stainless steel, chromium steel, bronze, brass, copper, natural fibers like wool, cotton, hemp, bamboo or cellulose, carbon fibers, glass fibers, mineral fibers or a polymer, for example polyamide, polyester, polypropylene, polyether ether ketone, polyphenylene sulfide and fluorine polymers. If the gas permeable material is a woven fabric, a netting, a mesh material or a non-woven or felt, usually fibers of the afore-mentioned materials are used. Particularly preferably, the gas permeable material is made of woven stainless steel braids, lattices or grids. If the gas permeable material is a perforated plate, the holes forming the perforation of the perforated plate may all have the same size or may have different sizes. Further, the holes may be distributed uniformly or randomly in the perforated plate. If a perforated plate is used as gas permeable material, it is particularly preferred, if the size of the holes in the perforated plate corresponds to the mesh size as described above.

The part of the tower shell which forms the inner wall of the annular duct is made of the gas permeable material at least partly in at least those regions where the gas withdrawal points are positioned. By making the part of the tower shell which forms the inner wall of the annular duct at least partly of the gas permeable material in those regions where the gas withdrawal points are positioned, the gas directly can flow through the gas permeable material into the gas withdrawal point. If a compressor is used to withdraw the gas from the apparatus into a gas withdrawal line, by forming the part of the tower shell of a gas permeable material in those regions where the gas withdrawal points are positioned a more uniform gas flow in the annular duct may be achieved as usually at the gas withdrawal points due to sucking of the compressor the pressure is lower than in those regions of the annular duct where no gas withdrawal point is located, so that due to the lower pressure the gas velocity in the regions where the gas withdrawal points are located is higher. By making the tower shell of the gas permeable material in the regions where the gas withdrawal points are located, the flow cross-section is increased and thus the velocity is reduced.

If the part of the tower shell which forms the inner wall of the annular duct is made partly of the gas permeable material, the parts made of the gas permeable material and the solid material of the tower shell may have any pattern. It is for example possible to have alternate sections made of the solid material of the tower shell and made of the gas permeable material or have openings of any form in the solid material which are closed with the gas permeable material. If the solid material of the tower shell and the gas permeable material form alternate sections, the section may run horizontal (perpendicular to the axis of the tower shell), vertical (parallel to the axis of the tower shell) or inclined with respect to the axis of the tower shell at any angle. If the solid material of the tower shell comprises openings which are closed with the gas permeable material, the opening may be uniformly distributed or randomly distributed and further may have all the same size or may have different sizes.

If the tower shell projecting into the region having at least partly a decreasing hydraulic diameter and forming the inner wall of the annular duct comprises horizontally running section, it is particularly preferred, that the tower shell forming the inner wall of the annular duct has an upper part which is made of the material of the tower shell and a lower part which is made of the gas permeable material. In this embodiment, the lower part completely is made of the gas permeable material.

If the tower shell is made of the gas permeable material only in those regions, where the gas withdrawal points are positioned, it is also possible, that those regions of the inner wall of the annular duct which are made of the gas permeable material comprise an upper part which is made of the material of the tower shell and a lower part which is made of the gas permeable material.

If the inner wall of the annular duct comprises an upper part which is made of the material of the tower shell and a lower part which is made of the gas permeable material, it is preferred, when the ratio of the height of the upper part to the height of the lower part is in a range from 0 to 3 More preferably, the ratio of the height of the upper part to the height of the lower part is an range from 0.5 to 2 and particularly in the range from 0.75 to 1.25. The area being made of the gas permeable material preferably is such that the ratio of the area made of the gas permeable material to gas volume stream is in a range from 0.1 to 1000 $m^2/(m^3/s)$, more preferred in a range from 0.5 to 100 $m^2/(m^3/s)$ and particularly in a range from 0.5 to 10 $m^2/(m^3/s)$.

In this context, "upper part" and "lower part" refer to the position in the tower shell. The "upper part" is closer to the device for dropletization than the "lower part". Further, the height of the upper part and the lower part is given with respect to a direction parallel to the axis of the tower shell.

Further, it is also possible that the part of the tower shell which forms the inner wall of the annular duct completely is made of the gas permeable material.

However, it is particularly preferred that the part of the tower shell projecting into the region having at least partly a decreasing hydraulic diameter and forming the inner wall of the annular duct has an upper part which is made of the material of the tower shell and a lower part which is made of the gas permeable material. In this embodiment, the lower part completely is made of the gas permeable material. Completely made of the gas permeable material also includes constructions with a support structure for example to connect segments of the gas permeable material or to stabilize the gas permeable material that it keeps its form. Such a support structure may cover up to 5% of the area made of the gas permeable material.

If only a part of the inner wall of the annular duct is made of the gas permeable material, the area made of the gas permeable material and the pressure loss characteristics of the gas permeable material preferably are selected such that at least 10%, more preferred at least 20% and particularly at least 30% of the total gas stream flow through the gas permeable material.

Independently of being made completely from the gas permeable material or only partly of the gas permeable material, the part of the tower shell projecting into the region having at least partly a decreasing hydraulic diameter and forming the inner wall of the annular duct may either be oriented parallel to the axis of the tower shell and thus having a constant cross sectional area or may have an increasing or decreasing cross sectional area, particularly with a uniformly increasing or decreasing hydraulic diameter. If the part of the tower shell projecting into the region having at least partly a decreasing hydraulic diameter and forming the inner wall of the annular duct has a circular cross sectional area and an increasing or decreasing hydraulic diameter, it is particularly preferred that this part of the tower shell has a frustoconical shape. Particularly preferably, the part of the tower shell forming the inner wall of the annular duct has an increasing or decreasing hydraulic diameter with an angle with respect to the axis of the tower shell in the range from −45 to +30°, more preferred in the range from −30 to +20° and particularly in the range from −25 to +10°. In this context, a positive angle means that the hydraulic diameter and thus the cross sectional area increases in direction to the lower end of the tower shell and accordingly a negative angle means that the hydraulic diameter and thus the cross sectional area decreases in direction to the lower end of the tower shell.

It is an advantage of an increasing hydraulic diameter of the part of the tower shell forming the inner wall of the annular duct that the particles produced in the apparatus cannot fall on this part and thus form fouling on that part. However, for reasons of gas flow and lower gas velocity on flowing into the annular duct it is preferred that the part of the tower shell forming the inner wall of the annular duct has a decreasing hydraulic diameter.

If the part of the tower wall forming the inner wall of the annular duct is completely made of the gas permeable material or if the lower part of the part of the tower wall forming the inner wall of the annular duct is completely made of the gas permeable material, it is preferred, that the gas permeable material forms segments which are connected one to the other. Particularly preferably, the segments have a height which corresponds to the distance from the lower end to the upper end of the part of the tower shell being made of the gas permeable material. To connect the gas permeable material and particularly to orientate the part of the tower shell being made of the gas permeable material in the desired direction, it is particularly preferred, if fixing elements are connected to the tower shell and the segments of the gas permeable material are fixed to the fixing elements. The fixing elements thereby preferably are in the form of bars which either are connected to the tower shell, for example by welding, screwing or bolting or integrally formed with the tower shell for example by cutting that parts from the material of the tower shell where the segments shall be fixed. Fixing of the segments of the gas permeable material on the fixing elements and/or on the tower shell for example also is possible by welding, screwing, soldering, gluing, clamping, pressing, spot welding, riveting, nailing, bolting or hanging using loops. Particularly preferably, for reasons of maintenance and to allow an exchange of the segments of the gas permeable material, the segments of the gas permeable material are fixed to the fixing elements by screwing.

To avoid fouling on the fixing elements, it is particularly preferred if the fixing elements are arranged on the outside, i.e. facing into the annular duct and not into the space enclosed by the tower shell.

The gas permeable material can be supported by a support structure or hang freely like a curtain. If a support structure is used, its design depends on the gas permeable material, on the size of the apparatus and on the gas velocities. Particularly if a strong movement of the gas permeable material is expected, it is preferred to provide a support structure. If the gas permeable material is fixed in segments on the tower shell, the fixing elements used for fixing the segments of the gas permeable material also can serve as support structure.

Besides forming at least partly the lower part of the tower shell which also forms the inner wall of the annular duct, it is additionally possible that the entrance into the annular duct is closed at least partially by the gas permeable material. For this purpose, the gas permeable material is connected to the lower edge of the tower shell which projects into the region having at least partly a decreasing diameter and to the region having at least partly a decreasing hydraulic diameter. By closing the annular duct at least partially with the gas permeable material it can be avoided that particles produced in the apparatus are withdrawn with the gas stream at the gas withdrawal points. Besides to only partially close the entrance into the annular duct it is also possible that the entrance into the annular duct is closed completely by the gas permeable material. However, it is preferred to only partially close the entrance into the annular duct to avoid clogging of the gas permeable material and thus an increase of the pressure loss and blocking of the entrance into the annular duct.

The outer wall of the annular duct which is formed by the upper part of the region having at least partly a decreasing hydraulic diameter also may have an increasing hydraulic diameter in the direction of the upper end of that region. However, preferably, at least the upper part of the region having at least partly a decreasing hydraulic diameter which forms the outer wall of the annular duct has a constant hydraulic diameter. The upper end of the annular duct is closed by a cover which connects the upper end of the region having at least partly a decreasing hydraulic diameter with the outside of the tower shell. The cover thereby may be oriented perpendicular to the axis of the tower shell and forming a flat cover or being of any suitable form. The cover may be designed for example such that it concludes the annular duct with a curved section, preferably a section which is parabolic, elliptical or in the form of a quarter circle. When the cover that concludes the annular duct in the upward direction has a curved section, the latter is aligned such that the curvature runs concave within the annular duct.

If the upper end of the region having at least partly a decreasing hydraulic diameter has a constant hydraulic diameter and the gas permeable material is connected to the region having at least partly a decreasing hydraulic diameter, the gas permeable material preferably is connected to the region having at least partly a decreasing hydraulic diameter at the transition from the constant hydraulic diameter to the decreasing hydraulic diameter.

At least one gas withdrawal point may be arranged either to the upper end of the region having at least partly a decreasing hydraulic diameter and forming the outer wall of the annular duct or to the cover of the annular duct. Independently of being arranged to the outer wall or to the cover of the annular duct, the gas withdrawal points are arranged such that the lower edge of the gas withdrawal points is at a higher position than the lower edge of the tower shell which forms the inner wall of the annular duct. Particularly if the cover is of a frustoconical shape, it is preferred to arrange the gas withdrawal points to the cover of the annular duct. To avoid overspeed of the flow in the annular channel at the lower edge of the wall of the tower shell projecting into the region having at least partly a decreasing hydraulic diameter it is preferred that the flow cross section between the lower edge of the permeable part of the shell and the outer wall of the annular duct is larger than 80% of the flow cross section in the annular duct, preferred larger than 90% and particularly preferably equal to or larger than 100%. The flow cross section in the annular duct is defined as the area of a horizontal cut of the annular duct at the lower edge of the impermeable part of the shell which forms the inner wall of the annular duct. The flow cross section between the lower edge of the permeable part of the shell and the outer wall of the annular duct is defined as the surface area of a cone that is connecting the edge with the outer wall of the annular duct and where the cone angle is such the cone surface is perpendicular to the outer wall.

In order to keep the cross-sectional area of the gas withdrawal points and hence also the gas flow flowing through one gas withdrawal point to a manageable size, and to assure a symmetric arrangement of the gas withdrawal points for an undisrupted flow profile in the apparatus, it is preferable when at least two gas withdrawal points are provided and the gas withdrawal points are arranged uniformly over the circumference of the annular duct. The number of gas withdrawal points is calculated from the gas volumes that flow through the apparatus and the cross-sectional area of the gas withdrawal points. It is particularly preferable when at least three gas withdrawal points are provided, and especially at least four gas withdrawal points. "Arranged uniformly over the circumference of the annular duct" means that the distance between the centers of two adjacent gas withdrawal points is the same in each case for all the gas withdrawal points.

To allow reusing the gas, it is preferred that the gas flows in a circuit. To provide the circuit, a gas duct connects the gas withdrawal point and the addition point for gas. The gas flow then can be supported by providing a gas conveying device in the gas duct.

As it cannot be excluded that particles of the product produced in the apparatus are withdrawn with the gas stream, it is possible to provide a solids separator in the gas duct. Suitable solid separators for example are filters or centrifugal separators, for example cyclones. In order to enable inspection or cleaning of the solid separator without interrupting the operation of the apparatus for producing a pulverulent product, it is possible to provide redundant systems in which two solid separators are provided in parallel in each case, and the gas stream is always conducted through one solid separator, while the other is switched off and can be cleaned, for example. This is advisable especially in the case of use of filters.

Besides solid separators like filters or centrifugal separators, it is also possible to additionally or alternatively provide further devices for gas workup, for example a gas scrubber or a condenser. Such devices for gas workup are particularly preferred if the gas is reused and flows in a circuit through a gas duct from the gas withdrawal point to the addition point for gas. In this case, the devices for gas workup preferably are arranged in the gas duct. If it is intended to feed a gas into the apparatus which contains water or solvent, it is also possible to load the gas with the solvent or water in a device for gas workup. The amount of water or solvent in the gas preferably is kept below the saturation point so that the water or solvent in the gas is in its gaseous state.

An apparatus for producing a pulverulent product generally comprises a head with the device for dropletization a liquid starting material, a middle region through which the liquid starting material falls and is converted into solid particles, and a bottom region into which the solid particles fall and where the solid withdrawal point is arranged. The solid withdrawal point thereby is at the lower end of the region having at least partly a decreasing hydraulic diameter.

In order that the liquid starting material exiting the device for dropletization is not sprayed onto the wall of the apparatus, and in order at the same time to configure the apparatus advantageously both in terms of statics and in terms of material costs, it is preferable to form the head of the apparatus in the shape of a frustocone and to position the device for dropletization in the frustoconical head of the apparatus.

The frustoconical configuration of the head of the apparatus makes it possible to economize on materials compared to a cylindrical configuration. Moreover, a frustoconical head improves the structural stability of the apparatus. A further advantage is that the gas which is introduced at the head of the apparatus has to be supplied through a relatively small cross section and subsequently, due to the frustoconical configuration, becomes better contact with the droplets produced in the device for dropletization and there is no gas bypass close to the walls of the frustoconical head.

In order to keep the height of the apparatus as low as possible, it is further advantageous when the device for dropletization of the liquid starting material is disposed as far upward as possible in the frustoconically configured head. This means that the device for dropletization of the liquid starting material is disposed at the height in the frustoconically configured head at which the diameter of the frustoconically configured head is roughly the same as the diameter of the device for dropletization.

In order to prevent the liquid starting material which exits the device for dropletization in the region of the outermost holes from being sprayed against the wall of the frustoconically configured head, it is particularly preferable when the hydraulic diameter of the frustoconically configured head, at the height at which the device for dropletization is disposed, is 2% to 30%, more preferably 4% to 25%, and more particularly 5% to 20%, greater than the hydraulic diameter of the area enclosed by the shortest line connecting the outermost holes. The somewhat greater hydraulic diameter of the head additionally ensures that droplets, even below the apparatus head, do not prematurely hit the apparatus wall and adhere thereto.

Above the device for dropletization of the liquid starting material there is an addition point for gas and gas and droplets, therefore, flow co-currently through the apparatus from top to bottom.

Preferably, the apparatus for producing a pulverulent product comprises a fluidized bed which is arranged at the bottom of the region having at least partly a decreasing hydraulic diameter. In the fluidized bed, the pulverulent product collects and may continue drying or reacting preferably without agglomerating of the individual particles. For fluidizing the pulverulent product in the fluidized bed, a fluidizing gas is fed into the fluidized bed at its bottom. This fluidizing gas also enters the apparatus and is withdrawn from the apparatus at the gas withdrawal point. From the fluidized bed the pulverulent product can be withdrawn at the solid withdrawal point.

Since the fluidized bed is in the lower region of the apparatus, the effect of this is that gas flows in the opposite direction from the bottom upward in the lower region of the apparatus. Since gas is introduced into the apparatus both from the top and from the bottom, the gas needs to be withdrawn between the device for dropletization of the liquid starting material and the fluidized bed. Therefore, the gas withdrawal point is positioned at the transition from the apparatus shell to the region having decreasing hydraulic diameter in the direction of the fluidized bed.

In the region with decreasing hydraulic diameter, the hydraulic diameter decreases from the top downward from the gas withdrawal point in the direction of the fluidized bed. The decrease in the hydraulic diameter is preferably linear, such that the region having decreasing hydraulic diameter takes the form of an upturned frustocone.

The tower shell which extends between the head having the device for dropletization and the gas withdrawal point preferably has a constant hydraulic diameter. More preferably, the tower shell is cylindrical. Alternatively, it is also possible to configure the tower shell such that the hydraulic diameter thereof increases from the top downward. In this case, however, it is preferable that the hydraulic diameter at the lower end of the tower shell is not more than 10%, preferably not more than 5% and especially not more than 2% greater than the hydraulic diameter at the transition from the apparatus head to the tower shell. More preferably, however, the tower shell is executed with a constant hydraulic diameter and the tower shell is more preferably cylindrical.

The height of the annular duct is preferably configured such that the ratio of the distance between the outer wall of the tower shell and the wall of the region having decreasing hydraulic diameter at the inlet into the annular duct and the height of the annular duct between the inlet into the annular duct and the lower edge of the gas withdrawal point is in the range from 0.05 to 50. Preferably, the ratio of the distance between the outer wall of the tower shell and the wall of the region having decreasing hydraulic diameter at the inlet into the annular duct and the height of the annular duct between the inlet into the annular duct and the lower edge of the gas withdrawal point is in the range from 0.2 to 25 and especially in the range from 0.3 to 10.

An appropriate ratio of the distance between the outer wall of the tower shell and the wall of the region having decreasing hydraulic diameter at the inlet into the annular duct and the height of the annular duct between the inlet into the annular duct and the lower edge of the gas withdrawal point achieves a sufficiently large volume of the annular duct in the form of a calming and settling zone in order to prevent the significant increase in velocity which occurs as a result of the standard cross-sectional constriction in the region of the gas withdrawal points, generally an increase in the velocity by at least a factor of 3, from leading to increased particle entrainment out of the apparatus.

The inlet into the annular duct is understood in the context of the present invention to mean the area formed at right angles to the axis of the apparatus between the lower end of the tower shell and the wall of the region having decreasing hydraulic diameter.

The apparatus can be used in any process for producing a particulate material from a liquid, for example spray drying or chemical reactions forming a solid powder from liquid reactants. Processes in which the apparatus for producing a particulate material may be used are for example process for producing particulate or granular solids like polymer particles, superabsorbents, catalysts, vitamins, enzymes, surfactants, pigments, pharmaceuticals, basic chemicals or zeolites. Particularly preferably, the apparatus is used in a process for producing pulverulent poly(meth)acrylate which for example is used as a superabsorbent. If the apparatus is used for producing pulverulent poly(meth)acrylate, the liquid starting material is a liquid monomer solution and the dropletized monomer solution is converted into polymer while falling through the middle region of the apparatus. In this case further the apparatus comprises the fluidized bed in which the produced particles fall and where the reaction is completed. Further, in the fluidized bed the produced particles are dried and remaining monomer is stripped from the particles.

Embodiments of the invention are shown in the figures and are more particularly described in the description which follows.

Figure 1:
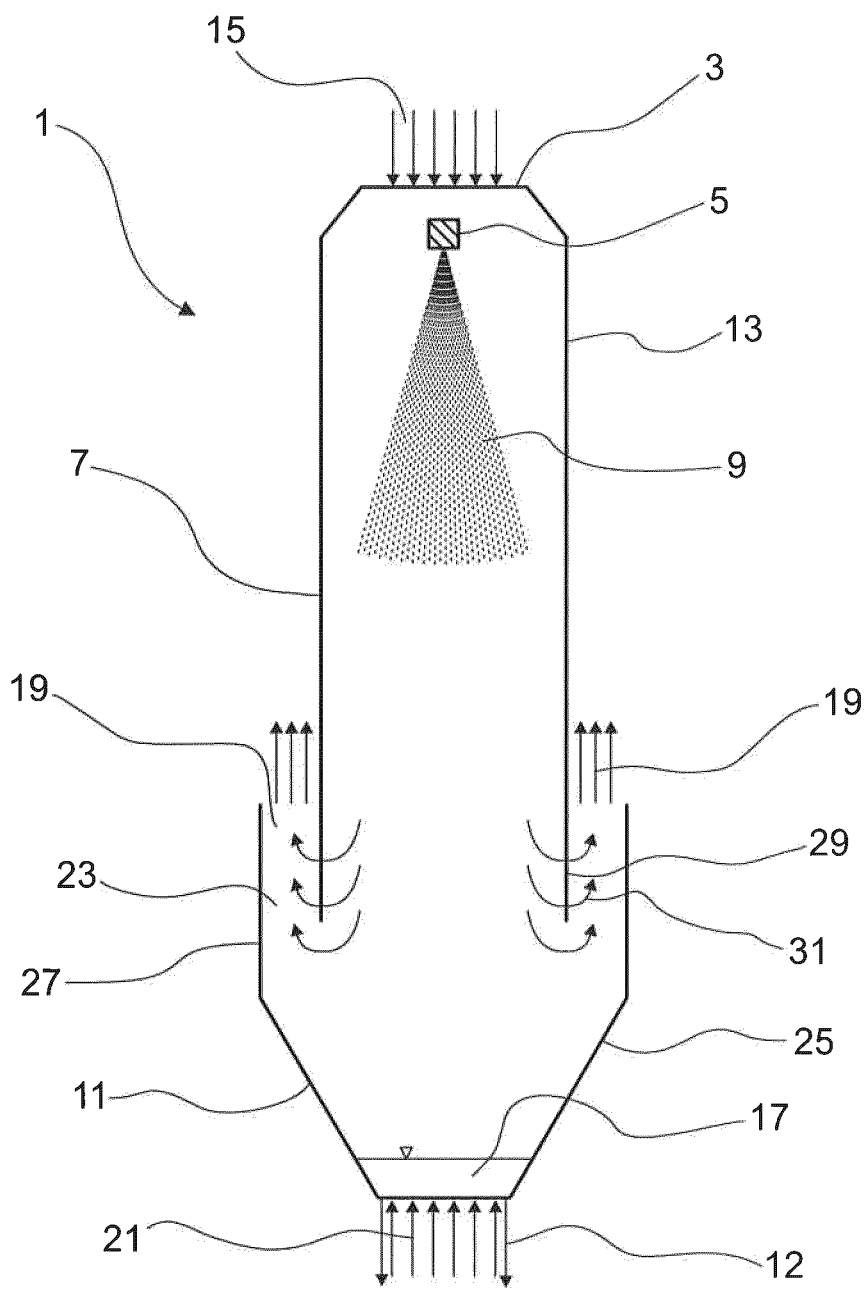
FIG. 1 shows a longitudinal section through an apparatus for producing a pulverulent product in a first embodiment.

An apparatus 1 for producing pulverulent product comprises a head 3 which accommodates a device for dropletization 5, a middle region 7 in which a liquid starting material 9 is transformed into solid particles and a lower region 11 having at least partly a decreasing hydraulic diameter and with a solid withdrawal point 12 at the bottom.

For producing the pulverulent product, the device for dropletization 5 is supplied with the liquid starting material 9. The device for dropletization 5 thereby can be any device by which droplets are formed and which is known by a skilled person. Particularly for the production of poly(meth) acrylate, it is preferred that the device for dropletization 5 comprises a plurality of channels each of which being connected to a monomer feed to provide a monomer solution which is the liquid starting material in the production of poly(meth)acrylate. In this case, for producing the droplets, each channel comprises holes on its bottom side through which the liquid starting material 9 falls into the apparatus in the form of small droplets. The size of the droplets thereby depends on the size of the holes and the viscosity, the flow velocity in the hole and the surface tension of the liquid starting material. Through a first addition site for a gas 15 above the device for dropletization 5, a gas, for example nitrogen or air, is introduced into the apparatus 1. This gas flow supports the disintegration of the liquid starting material 9 exiting from the device for dropletization 5 into individual droplets. In addition, the way in which the addition point for gas 15 is designed promotes lack of contact of the individual droplets and coalescence thereof to larger droplets.

The middle region 5 of the apparatus 1 is formed by a tower shell 13 which preferably is in the form of a cylinder having a constant hydraulic diameter. To make the tower shell 13 as short as possible and to further avoid droplets of the liquid starting material 9 hitting the tower shell 13, the head 3 is preferably conical, as shown here, in which case the device for dropletization 5 is within the conical head 3 above the cylindrical part of the tower shell 13, forming the middle region 7. Alternatively, however, it is also possible to form the head 3 of the apparatus 1 cylindrically with a diameter as in the middle region 7. Preference is given, however, to a conical configuration of the head 3. The position of the device for dropletization 5 is selected such that there is still a sufficiently large distance between the outermost holes through which the liquid starting material is supplied and the wall of the apparatus to prevent the droplets from hitting the wall. For this purpose, the distance should at least be in the range from 50 to 1500 mm, preferably from 100 to 1250 mm and particularly in the range from 200 to 750 mm. It will be appreciated that a greater distance from the wall of the apparatus is also possible. This has the disadvantage, however, that the greater distance is associated with poorer exploitation of the cross-section of the apparatus.

The lower region 11 may conclude with the fluidized bed 17, into which the particles fall which are formed from the liquid starting material during the fall. A fluidized bed 17 particularly is preferred if the apparatus 1 is used for producing poly(meth)acrylate. In this case, in the fluidized bed, further reaction proceeds to give the desired product. Preferably, the outermost holes through which the liquid starting material is dropletized are positioned such that a droplet falling vertically downward falls into the fluidized bed 17. This can be achieved, for example, by virtue of the hydraulic diameter of the fluidized bed 17 being at least as large as the hydraulic diameter of the area which is enclosed by a line connecting the outermost holes in the device for dropletization 5, the cross-sectional area of the fluidized bed and the area formed by the line connecting the outermost holes having the same shape and the centers of the two areas being at the same position in the vertical projection of one onto the other.

In order, in addition, to avoid droplets hitting the wall of the apparatus 1 in the middle region 7 as well, the hydraulic diameter at the level of the midpoint between the device for dropletization 5 and a gas withdrawal point 19 is at least 10% greater than the hydraulic diameter of the fluidized bed 17.

The apparatus 1 may have any desired cross-sectional shape. However, the cross-section of the apparatus 1 is preferably circular. In this case, the hydraulic diameter corresponds to the diameter of the apparatus 1.

Above the solid withdrawal point 12 and, if present, the fluidized bed 17 the diameter of the apparatus 1 increases in the embodiment shown here, such that the apparatus 1 widens conically from the bottom upward in the lower region 11. This has the advantage that particles formed in the apparatus 1 that hit the wall can slide downward to the solid withdrawal point 12 along the wall. To avoid caking, it is additionally possible to provide tappers, not shown here, on the outside of the conical part of the apparatus 1, with which the wall of the apparatus 1 is set in vibration, as a result of which adhering particles are detached and slide into the fluidized bed 17, if present, or to the solid withdrawal point 12.

For gas supply of the operation of the fluidized bed 17, a gas distributor 21 present beneath the fluidized bed 17 blows the gas into the fluidized bed 17.

Since gas is introduced into the apparatus 1 both from the top and from the bottom, it is necessary to withdraw gas from the apparatus 1 at a suitable position. For this purpose, at least one gas withdrawal point 19 is disposed at the transition from the middle region 7 having constant cross-section to the lower region 11 which has at least partly a decreasing hydraulic diameter. In this case, the wall of the cylindrical middle region 7 projects into the lower region 11 which has at least partly a decreasing hydraulic diameter, the diameter of the lower region 11 having at least partly a decreasing hydraulic diameter at this position being greater than the diameter of the middle region 7. In this way, an annular duct 23 which surrounds the wall of the middle region 7 is formed, into which the gas flows and can be drawn off through the at least one gas withdrawal point 19 connected to the annular duct 23.

For forming the annular duct 23, it is particularly preferred that the lower region 11 comprises a part 25 which widens conically and a part 27 having a constant hydraulic diameter, the part 27 having a constant hydraulic diameter thereby forming the outer wall of the annular duct 23.

The particles formed in the apparatus 1 are withdrawn through the at least one solid withdrawal point 12.

According to the invention, the part of the tower shell 13 which projects into the lower region 11 is made at least partly from a gas permeable material 29. By making at least a part of the tower shell 13 which projects into the lower region 11 from the gas permeable material 29, the velocity of the gas which flows into the annual duct 23 can be reduced as only a part of the gas flows into the annular duct through its entrance between the tower shell and the wall of the lower part 11 and the other part of the gas flows through the gas permeable material 29. This is shown by arrows 31. Due to the reduced gas velocity at the entrance into the annular duct particle entrainment can be reduced.

Figure 2:
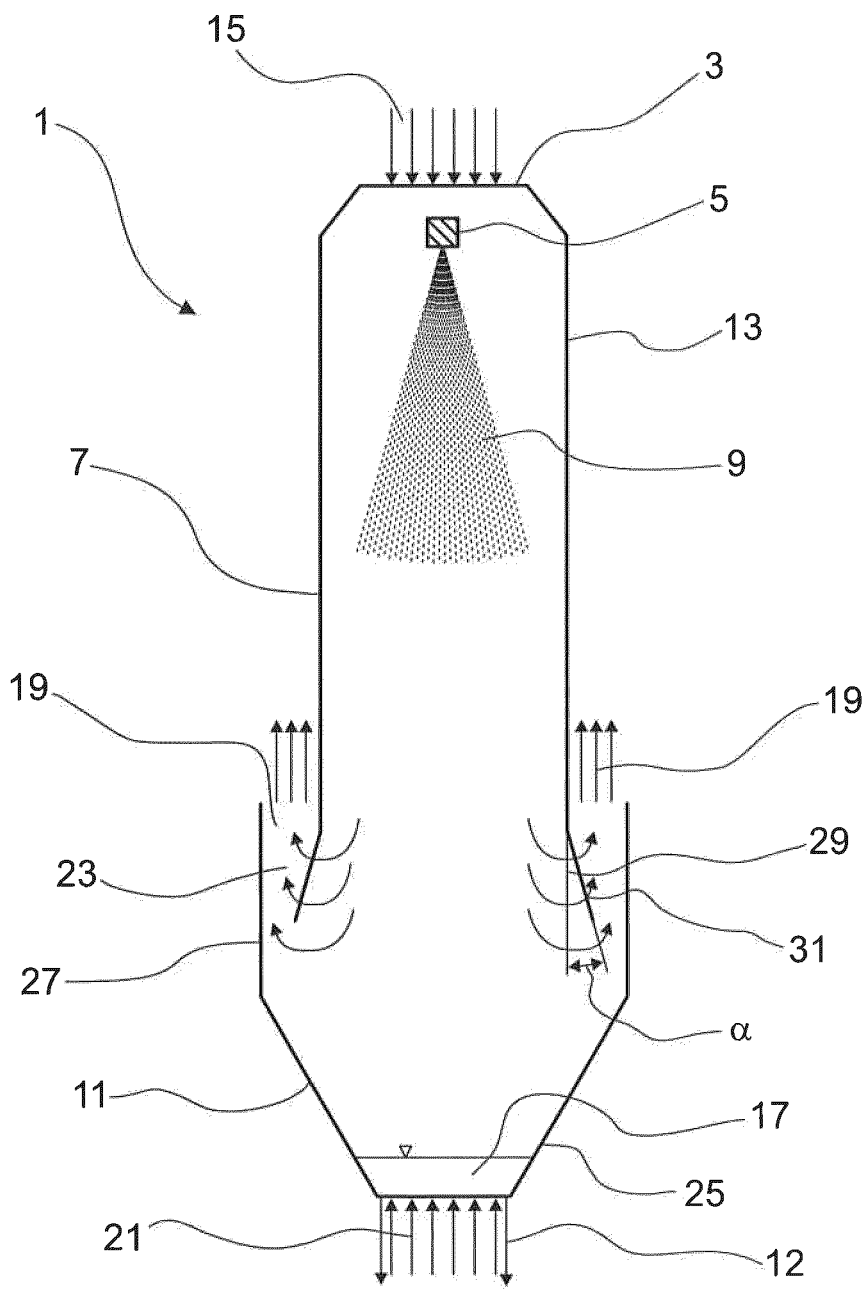
FIG. 2 shows a longitudinal section through an apparatus for producing a pulverulent product in a second embodiment.

FIG. 2 shows a longitudinal section through an apparatus for producing a pulverulent product in a second embodiment.

The embodiment shown in FIG. 2 differs from that in FIG. 1 in the orientation of the gas permeable material 29. In the embodiment shown in FIG. 1 the gas permeable material 29 is oriented parallel to the axis of the tower shell 13 which means the direct elongation of the tower shell without any bending or buckling. On the other hand, in the embodiment shown in FIG. 2 the gas permeable material 29 has an angle α with respect to the central axis of the tower shell 13.

If the gas permeable material 29 is oriented as shown in FIG. 2 it is possible that the entrance into the annular duct 23 is open as shown here or that the entrance into the annular duct 23 is at least partially closed by the gas permeable material 29. If the entrance into the annular duct 23 is closed at least partially by the gas permeable material 29, the gas permeable material 29 is connected to the wall of the lower region 11 which forms the outer wall of the annular duct 23.

Figure 3:
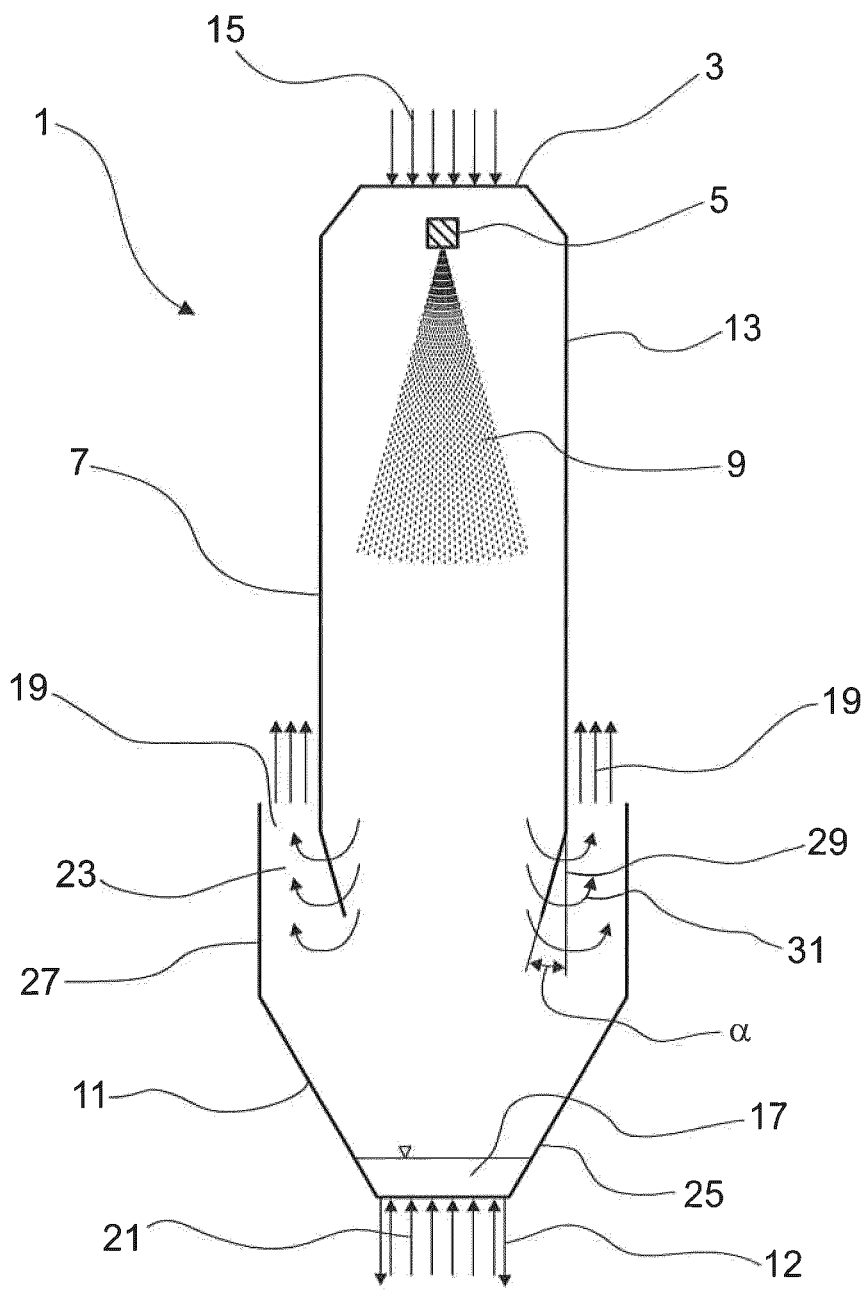
FIG. 3 shows a longitudinal section through an apparatus for producing a pulverulent product in a third embodiment.

A longitudinal section through an apparatus for producing a pulverulent product in a third embodiment is shown in FIG. 3.

The embodiment of FIG. 3 differs from the embodiment in FIG. 2 in the orientation of the gas permeable material 29. Instead of having an angle α such that the hydraulic diameter of the tower shell increases toward the lower edge of the tower shell as shown in FIG. 2, according to the embodiment in FIG. 3, the angle α is selected such that the hydraulic diameter of the tower shell decreases toward the lower edge of the tower shell by which the cross sectional area of the entrance into the annular duct 23 is larger compared to an orientation as shown in FIG. 1 or 2 and thus the velocity of the gas flowing around the lower edge of the tower shell into the annular duct is further reduced.

Figure 4A:
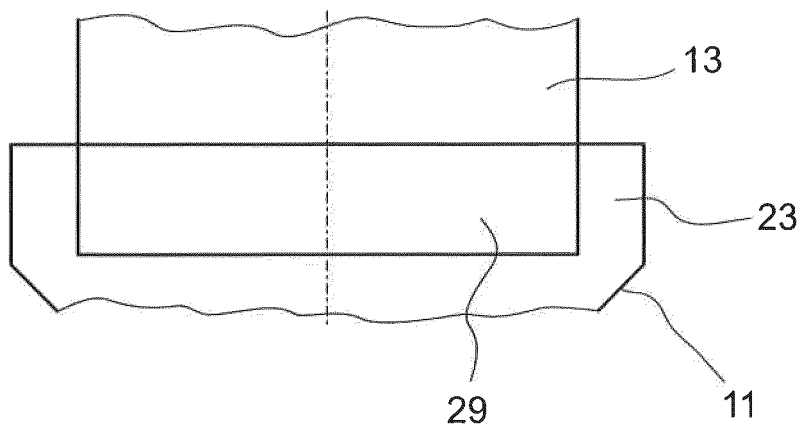
FIGS. 4a to 4c show different embodiments of the part of the tower shell projecting into the region having at least partly a decreasing hydraulic diameter.
Figure 4B:
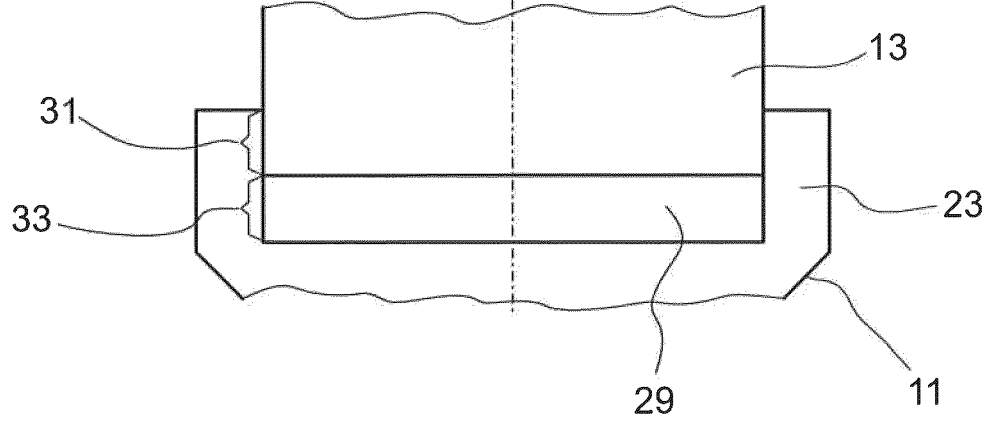
Figure 4C:
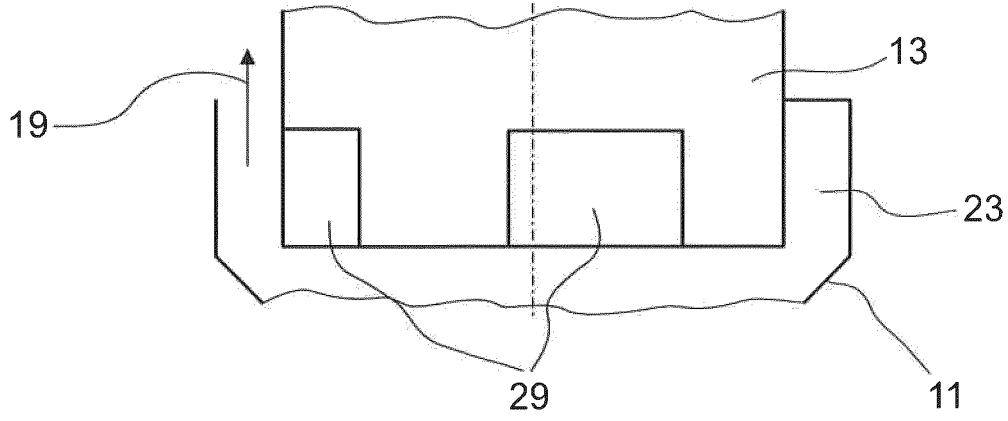

Examples of the design of the lower part of the tower shell 13 which projects into the lower region 11 for forming the annular duct 23 are shown in FIGS. 4a to 4c.

In FIG. 4a, the whole part of the tower shell 13 which projects into the lower region 11 which has at least partly a decreasing hydraulic diameter, completely is made of the gas permeable material 29. In this case, the complete inner wall of the annular duct 23, therefore, is made of the gas permeable material 29.

According to FIG. 4b, the part of the tower shell 13 which projects into the lower region 11 has an upper part 31 which is made up of the material of the tower shell 13 and a lower part 33 which is made up of the gas permeable material 29.

In the embodiment shown in FIG. 4c, only parts of the part of the wall of the tower shell 13 forming the inner wall of the annular duct 23 are made of the gas permeable material 29. In this case, it is particularly preferred, that the part of the tower shell 13 which projects into the lower region 11 and forming the inner wall of the annular duct 23 is made up the gas permeable material 29 in those regions where the gas withdrawal points 19 are arranged. However, it is also possible to make the part of the tower shell 13 forming the inner wall of the annular duct 23 partly of the gas permeable material 29 in any other pattern.

Figure 5A:
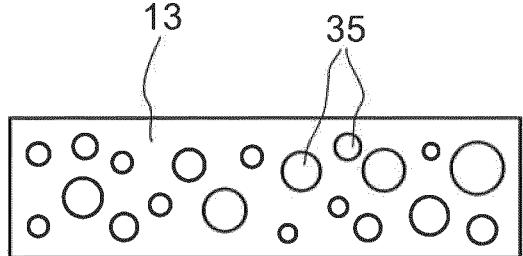
FIGS. 5a to 5c show different pattern of the gas permeable material in the part of the tower shell projecting into the region having at least partly a decreasing hydraulic diameter.
Figure 5B:
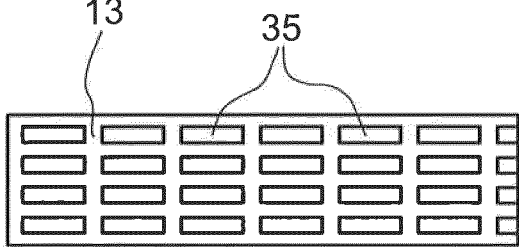
Figure 5C:
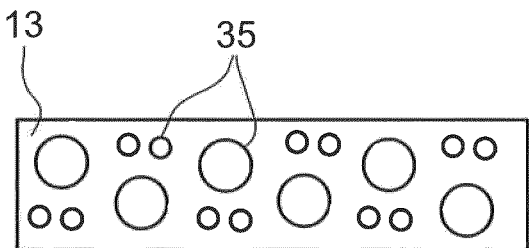

If only a part of the wall of the tower shell 13 forming the inner wall of the annular duct 23 is made of the gas permeable material 29, it is also possible to form openings 35 in the tower shell 13 which are closed by the gas permeable material. The openings 35 may have any geometry, for example circular as shown in FIG. 5a or rectangular as shown in FIG. 5b. The openings may be distributed uniformly or randomly. Further, the openings may all have the same size or have different sizes. FIG. 5a shows exemplary a random distribution of openings having different sizes and FIG. 5b a uniform distribution of openings which all have the same size. Besides the embodiments shown here where the openings with random distribution have different sizes it is also possible to randomly distribute openings which all have the same size. Further, it is also possible to have a uniform distribution of openings having different sizes. Such a pattern is shown exemplary for circular openings in FIG. 5c. Further, independently of whether the openings 35 are distributed randomly or uniformly, besides the geometries of the openings shown in FIGS. 5a to 5c, the openings may have any other form.

The invention claimed is:

1. An apparatus for producing a pulverulent product, comprising:
   a device for dropletization of a liquid phase;
   an addition point for a gas above the device for dropletization;
   at least one gas withdrawal point on a circumference of the apparatus;
   a solid withdrawal point; and
   a tower shell between the device for dropletization and the gas withdrawal point;
   wherein:
   the apparatus comprises, above the solid withdrawal point, a decreasing diameter region;
   at least a part of the decreasing diameter region decreases in hydraulic diameter toward the solid withdrawal point;
   the decreasing diameter region has a maximum hydraulic diameter greater than a mean hydraulic diameter of the tower shell;
   the tower shell projects into the decreasing diameter region such that an annular duct is formed between a part of the tower shell projecting into the decreasing diameter region and an upper part of the decreasing diameter region;
   the at least one gas withdrawal point is disposed in the annular duct; and
   the part of the tower shell projecting into the decreasing diameter region and forming an inner wall of the annular duct is made at least partly of a gas permeable material.

2. The apparatus according to claim 1, wherein the gas permeable material is a metal braid, a woven fabric, a netting, a grid material or a mesh material.

3. The apparatus according to claim 1, wherein the gas permeable material has a mesh size in the range from 0.5 µm to 5 mm.

4. The apparatus according to claim 1, wherein the part of the tower shell projecting into the decreasing diameter region and forming the inner wall of the annular duct is made of the gas permeable material in regions where the gas withdrawal points are positioned.

5. The apparatus according to claim 1, wherein the part of the tower shell projecting into the decreasing diameter region and forming the inner wall of the annular duct has a lower part which is made of the gas permeable material and an upper part which is made of a same material as a part the tower shell not projecting into the decreasing diameter region.

6. The apparatus according to claim 5, wherein the ratio of a height of the upper part to a height of the lower part is in a range from 0 to 3.

7. The apparatus according to claim 1, wherein the part of the tower shell projecting into the decreasing diameter region and forming the inner wall of the annular duct is completely made of the gas permeable material.

8. The apparatus according to claim 1, wherein an entrance into the annular duct is closed at least partially by the gas permeable material by connecting the gas permeable material to the end of the tower shell which projects into the region having at least partly a decreasing hydraulic diameter and to the region having at least partly a decreasing diameter.

9. The apparatus according to claim 1, wherein the gas permeable material is made of a plurality of segments which are joined together.

10. The apparatus according to claim 1, wherein the gas permeable material is made of at least one of stainless steel, chromium steel, bronze, brass, copper, natural fibers, carbon fibers, glass fibers, mineral fibers or a polymer.

11. The apparatus according to claim 1, wherein the decreasing diameter region has a constant hydraulic diameter at the upper part which forms an outer wall of the annular duct.

12. The apparatus according to claim 1, wherein a gas duct connects the gas withdrawal point and the addition point for gas.

13. The apparatus according to claim 12, wherein the gas duct comprises a gas conveying device.

14. The apparatus according to claim 1, wherein the pulverulent product is a poly(meth)acrylate.

* * * * *